(12) United States Patent
Tse

(10) Patent No.: US 7,416,084 B2
(45) Date of Patent: Aug. 26, 2008

(54) APPARATUS FOR PIERCING GARBAGE BAGS AND COLLECTING NONRIGID, ELONGATE OBJECTS AND POWDER

(75) Inventor: Steven Tse, Guangzhou (CN)

(73) Assignee: WST International (Holdings) Limited, Victoria, Mahe (SC)

( * ) Notice: Subject to any disclaimer, the term of this patent is extended or adjusted under 35 U.S.C. 154(b) by 510 days.

(21) Appl. No.: 11/250,802

(22) Filed: Oct. 13, 2005

(65) Prior Publication Data

US 2007/0084765 A1  Apr. 19, 2007

(51) Int. Cl.
  B07B 1/24  (2006.01)
  B07C 9/00  (2006.01)
  B02C 17/20  (2006.01)

(52) U.S. Cl. .................. 209/294; 209/284; 209/930; 209/627; 209/683; 209/688; 209/257; 209/616; 414/412; 241/299

(58) Field of Classification Search .................. 209/930, 209/688, 689, 690, 284, 287, 288, 289, 293, 209/294, 296, 297, 298, 299, 257, 615, 616, 209/627, 680, 683; 414/412; 241/74, 299
See application file for complete search history.

(56) References Cited

U.S. PATENT DOCUMENTS 5,163,627 A * 11/1992 Bouche ....................... 241/23
5,339,961 A * 8/1994 Mayhak ......................... 209/3
6,003,680 A * 12/1999 Finn ........................... 209/616
6,955,265 B2 * 10/2005 Tse ............................. 209/683

* cited by examiner

Primary Examiner—Patrick Mackey
Assistant Examiner—Mark Hageman
(74) Attorney, Agent, or Firm—Ware, Fressola, Van Der Sluys & Adlophson, LLP

(57) ABSTRACT

Provided is an apparatus comprising a screen assembly for sifting powder including a rear feeding device, a first conveyor adapted to convey garbage bags from the feeding device to the screen assembly, an inclined board extended downwardly from a front end of the screen assembly, and a second conveyor provided below the board, the second conveyor being adapted to convey materials leaving the screen assembly to a subsequent station for processing; and a nonrigid, elongate object collection assembly extended from the rear of the screen assembly through the screen assembly to a point in front of the screen assembly, the object collection assembly including an elongate housing of rectangular section, a gable roof provided on the housing, a lengthwise gap provided on a top of the gable roof, and a container provided below a front end thereof for collecting nonrigid, elongate objects dropped therefrom.

8 Claims, 7 Drawing Sheets

FIG. 4(A-A)

APPARATUS FOR PIERCING GARBAGE BAGS AND COLLECTING NONRIGID, ELONGATE OBJECTS AND POWDER

BACKGROUND OF THE INVENTION

1. Field of Invention

The present invention relates to garbage disposal and more particularly to an apparatus for piercing garbage bags and collecting nonrigid, elongate objects and powder with improved characteristics.

2. Description of Related Art

It is known that a wide variety of materials are contained in garbage. Typically, garbage collection employees have to open garbage bags to find recyclable items contained therein. This is a difficult, dangerous job since stained materials, household hazardous wastes, or the like may contain in garbage bags. Thus, continuing improvements in the exploitation of garbage disposal for effectively sifting materials in the garbage so as to facilitate subsequent processing are constantly being sought.

SUMMARY OF THE INVENTION

It is therefore an object of the present invention to provide an apparatus for disposing garbage bags comprising a rotatable, hollow, cylindrical screen assembly for sifting powder including a feeding device spaced from a rear end, a first conveyor adapted to convey the garbage bags from the feeding device to the screen assembly, an inclined board extended downwardly from a lower portion of a front end of the screen assembly, and a second conveyor provided below the board, the second conveyor being adapted to convey materials leaving the screen assembly to a subsequent station for processing; and a nonrigid, elongate object collection assembly extended from the rear end of the screen assembly through the screen assembly to a point in front of the screen assembly, the object collection assembly including an elongate housing of rectangular section, a gable roof provided on the housing, a lengthwise gap provided on a top of the gable roof, and a first container provided below a front end thereof for collecting nonrigid, elongate objects dropped therefrom.

In one aspect of the present invention the screen assembly further comprises a lengthwise plate having a curved surface provided on an inner surface thereof, the plate including a plurality of paws formed on the curved surface, and a plurality of pointed blades formed on the inner surface thereof, the blades being disposed lengthwise and opposite the plate.

In another aspect of the present invention a first drive source, an endless transmission being driven by the first drive source and enclosed by the housing, the transmission including two parallel endless chains, and a plurality of equally spaced posts fixedly connected between the chains.

In a further aspect of the present invention, there is further provided a cleaning assembly at one side of the screen assembly faced the holes, the cleaning assembly including two spaced brackets, a drive shaft formed between the brackets, a plurality of brush wheels rotatably formed on the drive shaft, and a drive and transmission device, the drive and transmission device being adapted to push the brush wheels to contact the holes and rotate the brush wheels for cleaning blockage in the holes of the screen assembly.

The above and other objects, features and advantages of the present invention will become apparent from the following detailed description taken with the accompanying drawings.

DETAILED DESCRIPTION OF THE INVENTION

Figure 1:
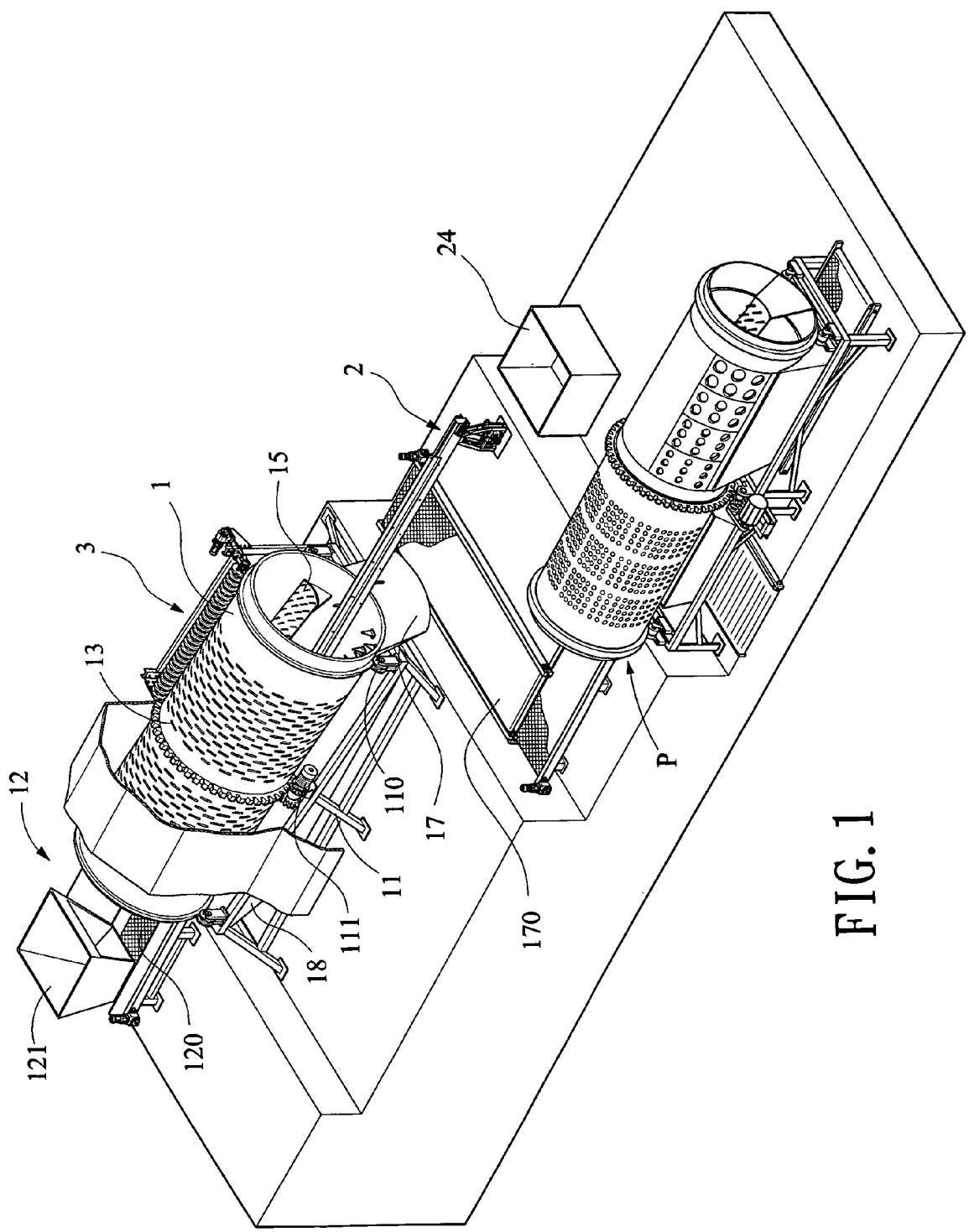
FIG. 1 is a perspective view of a preferred embodiment of apparatus for disposing garbage bags according to the invention.
Figure 2:
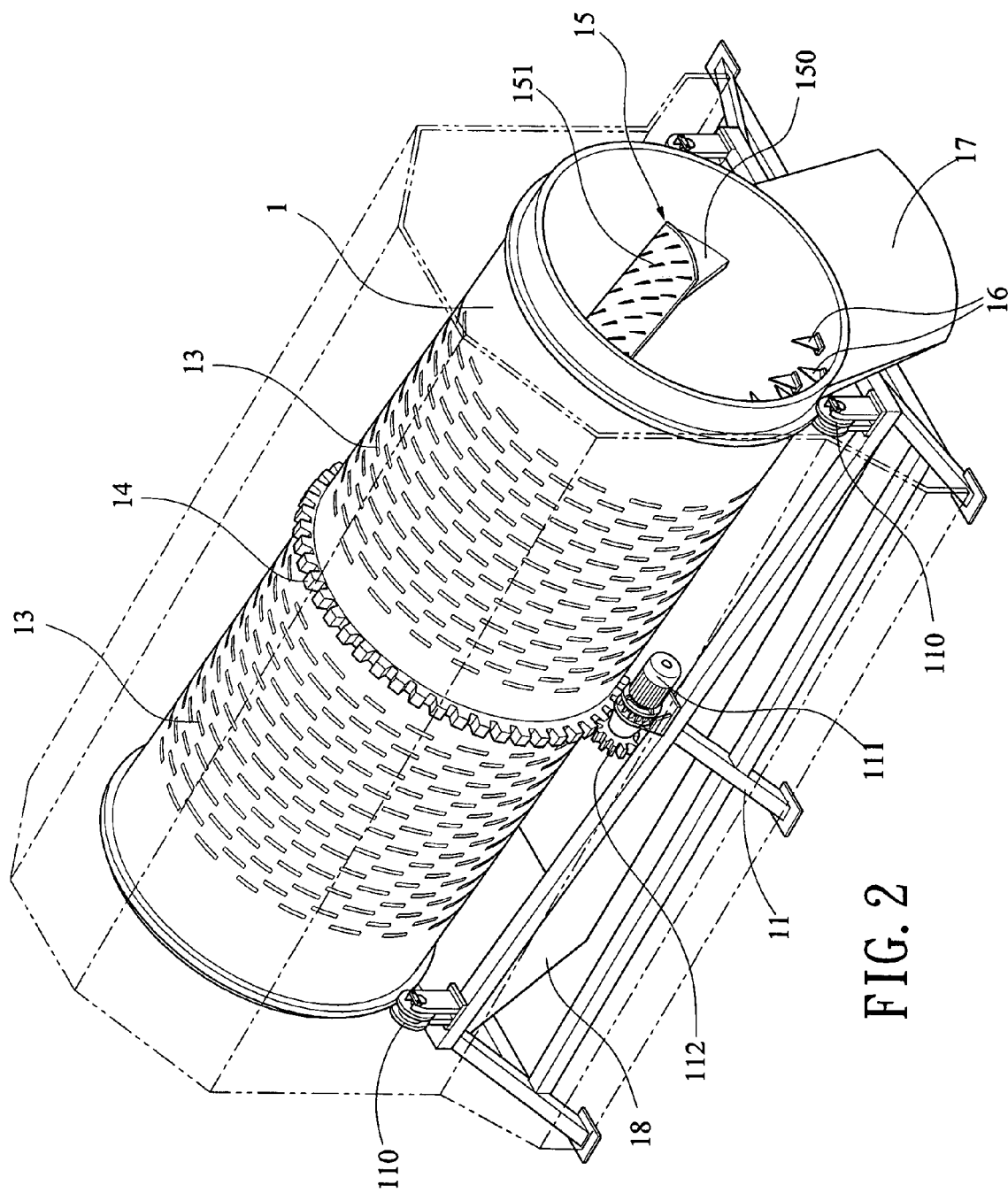
FIG. 2 is a greatly enlarged perspective view of the screen assembly in FIG. 1.
Figure 3:
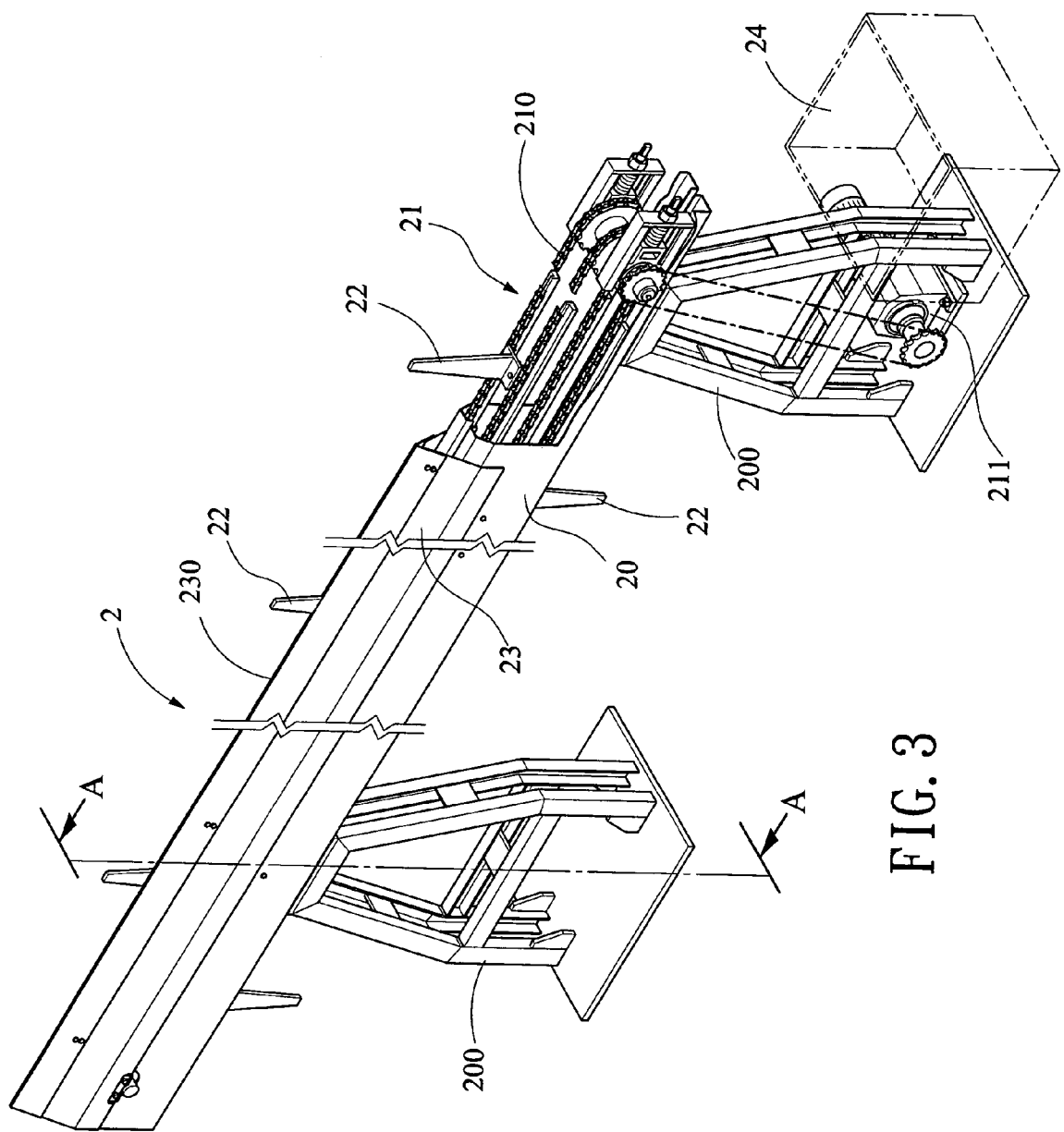
FIG. 3 is a greatly enlarged perspective view in part broken away of the nonrigid, elongate object collection assembly in FIG. 2.
Figure 4:
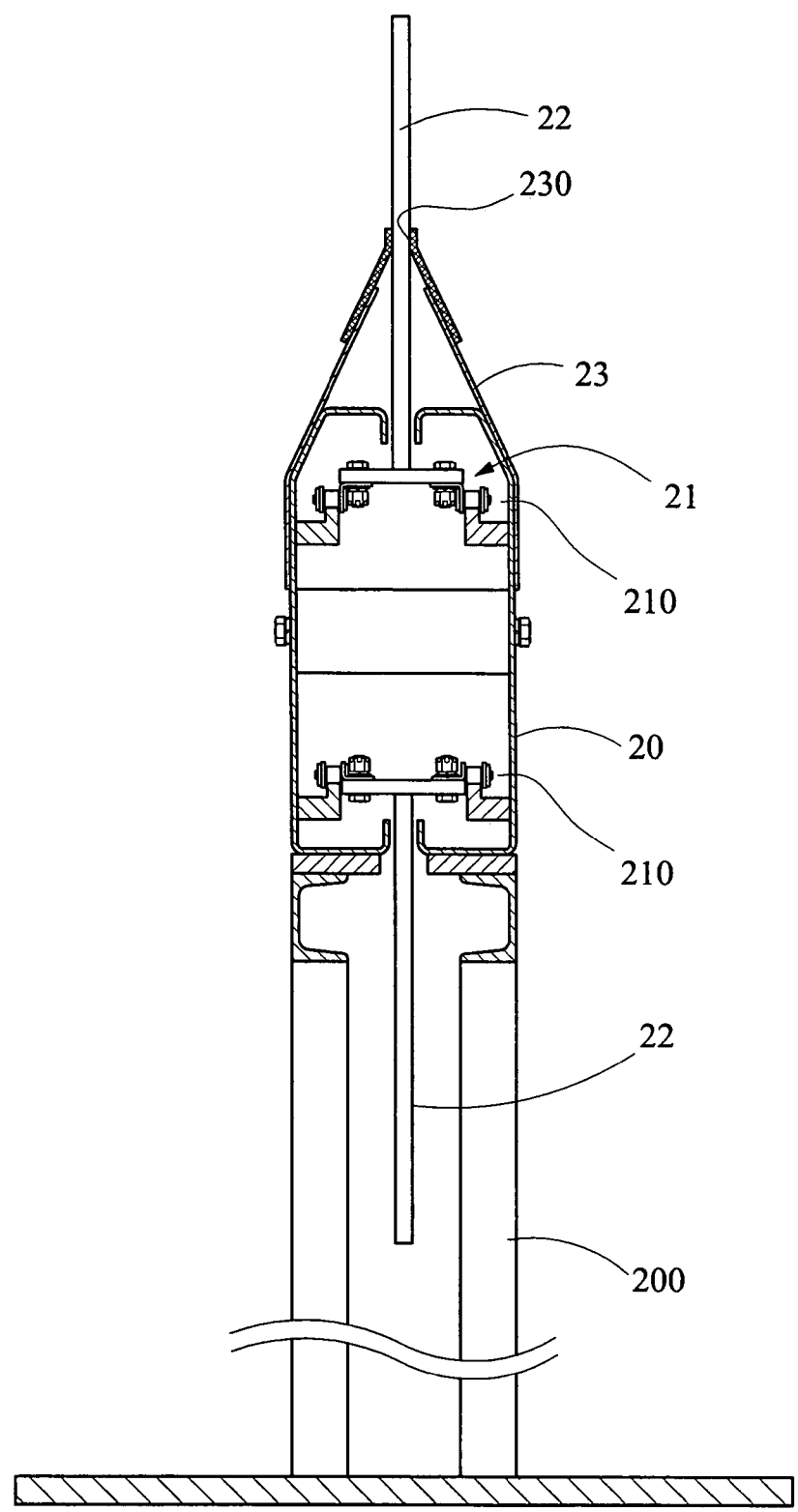
FIG. 4 is a sectional view taken along line A-A in FIG. 3.

Referring to FIGS. 1 to 6, an apparatus for disposing garbage bags in accordance with a preferred embodiment of the invention is shown. The apparatus comprises a screen assembly 1, a nonrigid, elongate object collection assembly 2 and a cleaning assembly 3. Each component is discussed in detailed below.

The screen assembly 1 is a hollow cylinder and comprises a support 11 for obliquely supporting the screen assembly 1. Preferably, the screen assembly 1 is inclined about 4 degree from rear end to front end with respect to a supporting platform (i.e., rear end is higher than front end). The support 11 comprises three rollers 110 at either side for rotatably supporting the screen assembly 1 above the supporting platform by a distance. A funnel-shaped first container 18 is provided under the screen assembly 1.

A feeding device 12 is provided in the rear of the screen assembly 1. The feeding device 12 comprises a chute 121 and a first conveyor 120 below the chute 121, the first conveyor 120 being adapted to convey garbage bags from the chute 121 to the screen assembly 1. The first conveyor 120 is supported by legs.

A plurality of rectangular holes 13 are formed on an outer surface of the screen assembly 1. Preferably, the hole 13 has a length of 15 cm and a width of 4 cm such that powder having a diameter less than 4 cm can be separated by the screen assembly 1.

A gear 14 is formed around middle of the screen assembly 1. A pinion 112 is provided at one side of the screen assembly 1 and is in gear engagement with the gear 14. A drive source (e.g., motor) 111 is adapted to drive the pinion 112 such that the screen assembly 1 may rotate about the support 11 in response to activating the drive source 111.

A lengthwise plate 15 having a curved surface is provided on an inner surface of the screen assembly 1. The plate 15 is supported by a bracket 150 fixedly connected to the inner surface of the screen assembly 1. The plate 15 comprises a plurality of paws 151 on the curved surface. A plurality of short, pointed blades 16 are also formed on the inner surface of the screen assembly 1. The pointed blades 16 are also disposed lengthwise and are disposed in opposing relationship with the plate 15. An inclined board 17 having a curved surface is extended downwardly from a lower portion of the front end of the screen assembly 1. A second conveyor 170 is provided below the board 17. The second conveyor 170 is adapted to convey materials leaving the screen assembly 1 to a subsequent device for further processing.

The inclined nonrigid, elongate object collection assembly 2 is extended from the rear of the screen assembly 1 through the screen assembly 1 to a place in front of the screen assembly 1. The nonrigid, elongate object collection assembly 2 comprises an elongate housing 20 having a rectangular section. The housing 20 is supported by two supports 200 in which one higher support 200 is provided above the first conveyor 120 and one lower support 200 is provided in front of the screen assembly 1. An endless transmission 21 is enclosed by the housing 20. The transmission 21 comprises two parallel endless chains 210 and is driven by a drive source (e.g., motor) 211 by means of a transmission belt. A plurality of equally spaced posts 22 are fixedly connected between the parallel chains 210. A gable roof 23 is formed on the housing 20. A lengthwise gap 230 is formed on a top of the gable roof 23. The gap 230 is sufficiently wide for permitting the posts 22 to project therefrom. Also, the roof 23 is adapted to prevent garbage materials on the inner surface of the screen assembly 1 from falling onto the chains 210 through the gap 230 when the transmission 21 is activating. A second container 24 is provided below a front end of the nonrigid, elongate object collection assembly 2 for collecting nonrigid, elongate objects dropped therefrom.

In operation, first turn on the drive source 111 to rotate the screen assembly 1 and turn on the drive source 211 to activate the nonrigid, elongate object collection assembly 2. The transmission 21 and thus the posts 22 move around. A plurality of garbage bags are thrown into the chute 121 of the feeding device 12 prior to conveying to the screen assembly 1 by the first conveyor 120. The pointed blades 16 are adapted to pierce garbage bags rotating around the inner surface of the activating screen assembly 1. Contents in the garbage bags are thus scattered in the screen assembly 1. Also, the paws 151 of the plate 15 are adapted to hold nonrigid, elongate objects A and materials B other than nonrigid, elongate objects may fall from the plate 15 onto bottom of the rotating screen assembly 1. Powder and small objects are contained in the materials B other than nonrigid, elongate objects in which powder passes through the holes 13 to fall onto the first container 18 under the screen assembly 1.

Figure 5:
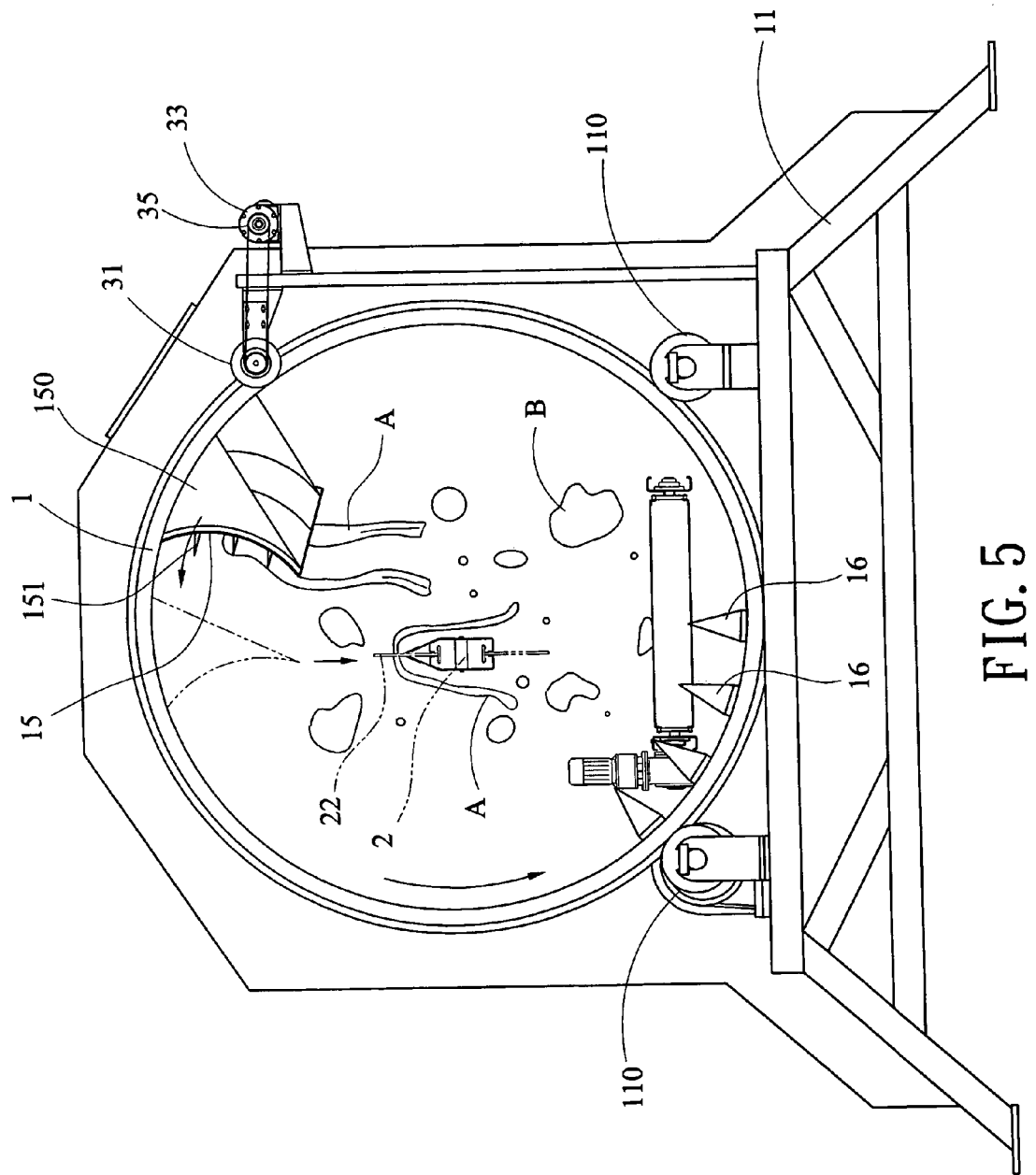
FIG. 5 is a side view of the apparatus schematically depicting an operation of disposing garbage according to the invention.
Figure 6:
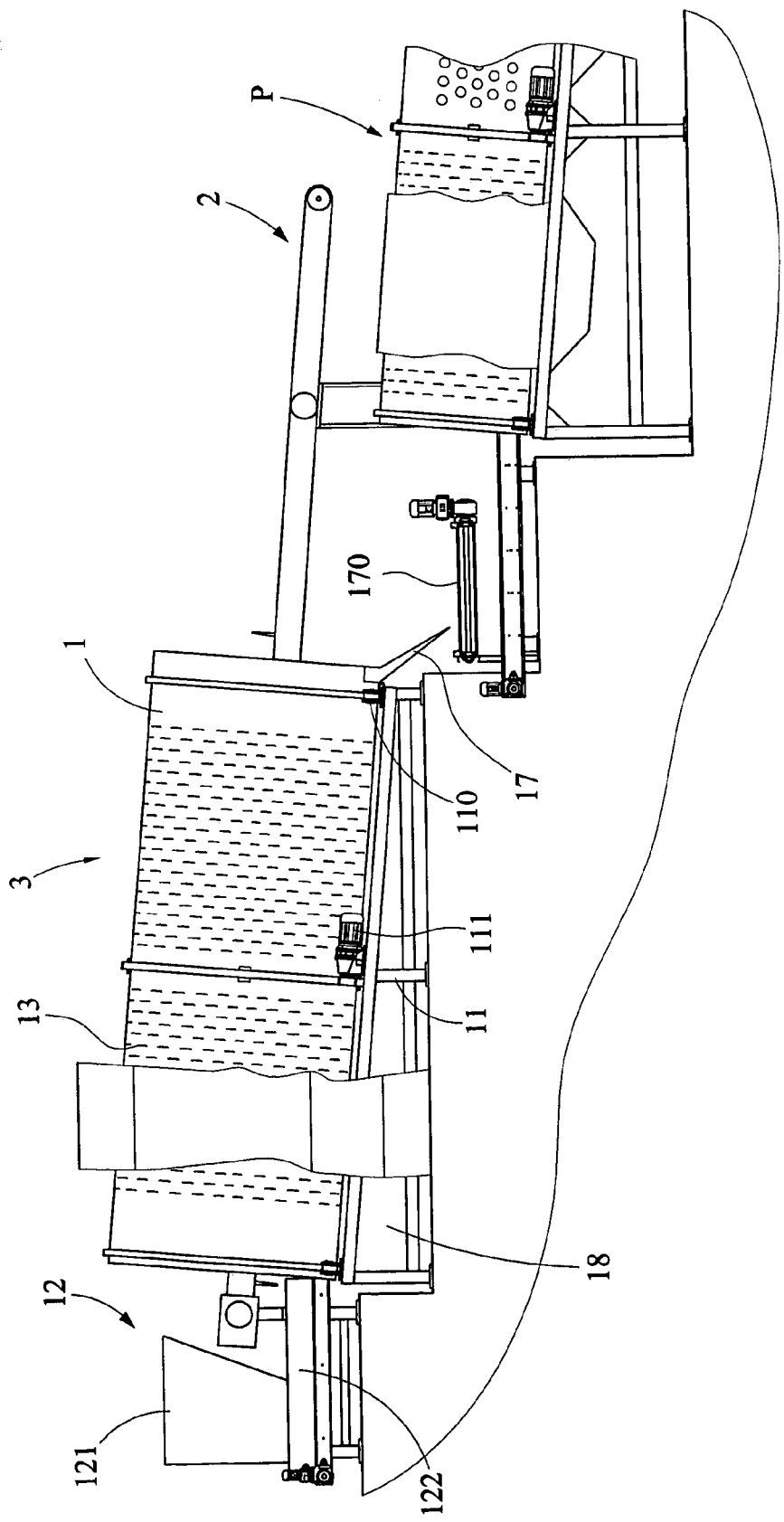
FIG. 6 is a side view of a portion of the apparatus in FIG. 1.

The nonrigid, elongate objects A may fall from the plate 15 due to gravity when the plate 15 rotates to a highest point in the screen assembly 1. The pointed top end of the post 22 thus may grab the fallen nonrigid, elongate objects A, as shown in FIG. 5. It is often that the nonrigid, elongate objects A may extend across both sides of the roof 23 (see FIG. 5) since the nonrigid, elongate object A is elongate. At the same time, the posts 22 move along the roof 23 toward the second container 24. At the forward end of the housing 20 the nonrigid, elongate objects A may fall into the second container 24. The posts 22 may continue its movement by moving to a lower half of the housing 20 in one cycle.

Garbage materials other than nonrigid, elongate objects A and powder may move toward the front end of the screen assembly 1. Finally, they fall onto the second conveyor 170 through the inclined board 17. These materials are then conveyed to a subsequent device P for further processing. Details of the subsequent processing is omitted herein because it is not the subject of the invention.

Figure 7:
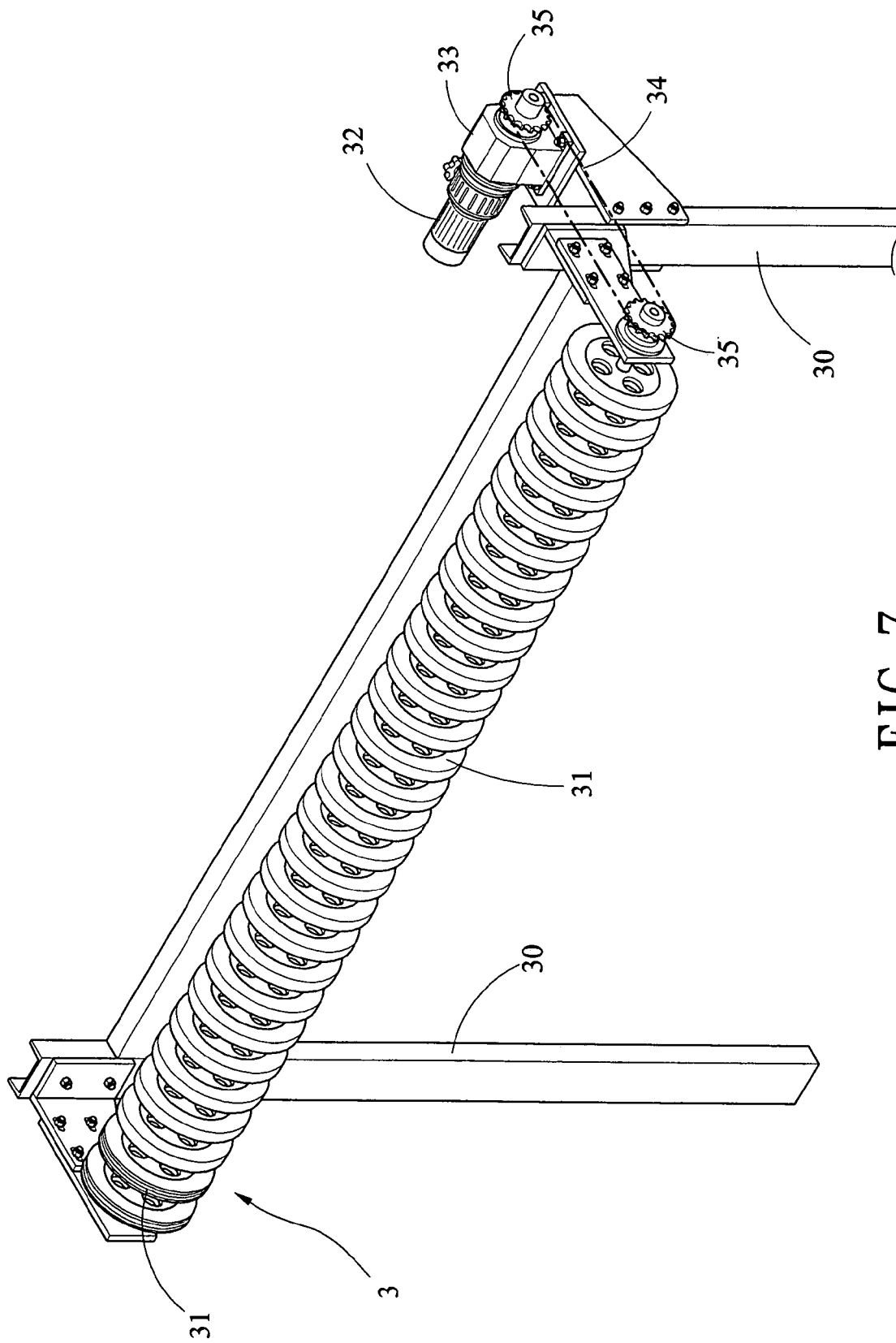
FIG. 7 is a perspective view of the cleaning assembly in FIG. 1.

Referring to FIG. 7 in conjunction with FIG. 1, the holes 13 on the screen assembly 1 may be blocked by garbage after a period time of operation. Thus, a cleaning assembly 3 is provided at an upper portion along one side of the screen assembly 1 and is disposed facing the holes 13. The cleaning assembly 3 comprises two spaced brackets 30. A plurality of brush wheels 31 are rotatably formed on a drive shaft between the brackets 30. Each of the brush wheels 31 is formed of hard bristles. The brush wheels 31 are driven by a motor 32 through a gearbox 34, two spaced wheels 35, and a transmission chain 34 put around the wheels 35. In case of blockage in the holes 13, an employee may turn on the motor 32 to push the brush wheels 31 to contact the holes 13 and rotate the brush wheels 31 for cleaning the blockage. Alternatively, the activation of the motor 32 (i.e., cleaning) may be regular by setting.

While the invention herein disclosed has been described by means of specific embodiments, numerous modifications and variations could be made thereto by those skilled in the art without departing from the scope and spirit of the invention set forth in the claims.

What is claimed is:

1. An apparatus for disposing garbage bags comprising:
    a rotatable, hollow, cylindrical screen assembly for sifting powder including a feeding device spaced from a rear end, a first conveyor adapted to convey the garbage bags from the feeding device to the screen assembly, an inclined board extended downwardly from a lower portion of a front end of the screen assembly, and a second conveyor provided below the board, the second conveyor being adapted to convey materials leaving the screen assembly to a subsequent station for processing; and
    a nonrigid, elongate object collection assembly extended from the rear end of the screen assembly through the screen assembly to a point in front of the screen assembly, the object collection assembly including an elongate housing of rectangular section, a gable roof provided on the housing, a lengthwise gap provided on a top of the gable roof, and a first container provided below a front end thereof for collecting nonrigid, elongate objects dropped therefrom.

2. The apparatus of claim 1, wherein the screen assembly further comprises a plurality of rectangular holes formed on an outer surface thereof, a gear provided around a middle portion thereof, a pinion provided at one side thereof and being in gear engagement with the gear, and a first drive source adapted to drive the pinion.

3. The apparatus of claim 2, further comprising a cleaning assembly provided at one side of the screen assembly and faced the holes, the cleaning assembly including two spaced brackets, a drive shaft formed between the brackets, a plurality of brush wheels rotatably formed on the drive shaft, and a drive and transmission device, the drive and transmission device being adapted to push the brush wheels to contact the holes and rotate the brush wheels for cleaning blockage in the holes.

4. The apparatus of claim 1, wherein the screen assembly further comprises a lengthwise plate having a curved surface provided on an inner surface thereof, the plate including a plurality of paws formed on the curved surface, and a plurality of pointed blades formed on the inner surface thereof, the blades being disposed lengthwise and opposite the plate.

5. The apparatus of claim 1, further comprising a second drive source, an endless transmission being driven by the second drive source and enclosed by the housing, the transmission including two parallel endless chains, and a plurality of equally spaced posts fixedly connected between the chains.

6. The apparatus of claim 1, wherein the screen assembly is inclined from its rear end to its front end.

7. The apparatus of claim 1, wherein the screen assembly further comprises a support including a plurality of top rollers at either side of the screen assembly for rotatably supporting the screen assembly above a bottom of the support by a predetermined distance.

8. The apparatus of claim 1, wherein the feeding device comprises a chute above the first conveyor.

* * * * *